(12) United States Patent
Li

(10) Patent No.: US 9,248,712 B2
(45) Date of Patent: Feb. 2, 2016

(54) AUTOMOBILE TIRE ANTI-SKID CHAIN EQUIPPED WITH TIGHTENING SIDE CHAINS

(71) Applicant: SHANGQUI HONGDA AUTOMOBILE ANTI-SKID EQUIPMENT CO., LTD., Shangqui, Henan (CN)

(72) Inventor: Hongjun Li, Henan (CN)

(73) Assignee: Shangqui Hongda Automobile Anti-Skid Equip Co., Ltd., Shangqui, Henan (CN)

( * ) Notice: Subject to any disclaimer, the term of this patent is extended or adjusted under 35 U.S.C. 154(b) by 245 days.

(21) Appl. No.: 13/979,409

(22) PCT Filed: Sep. 21, 2012

(86) PCT No.: PCT/CN2012/081757
§ 371 (c)(1),
(2) Date: Jul. 12, 2013

(87) PCT Pub. No.: WO2013/063989
PCT Pub. Date: May 10, 2013

(65) Prior Publication Data
US 2013/0276948 A1    Oct. 24, 2013

(30) Foreign Application Priority Data

Nov. 4, 2011 (CN) .................. 2011 2 0433145 U

(51) Int. Cl.
B60C 27/06 (2006.01)
B60C 27/10 (2006.01)
(52) U.S. Cl.
CPC ................ *B60C 27/10* (2013.01); *B60C 27/06* (2013.01)

(58) Field of Classification Search
CPC .......... B60C 27/06; B60C 27/10; B60C 27/20
USPC .................................... 152/216–233
See application file for complete search history.

(56) References Cited

U.S. PATENT DOCUMENTS 4,588,010 A * 5/1986 Melzi et al. ................ 152/213 A
6,675,850 B2 * 1/2004 Sakuma ........................ 152/221

FOREIGN PATENT DOCUMENTS

| CN | 2192496 Y | 3/1995 |
| CN | 2820583 Y | 9/2006 |
| CN | 201511767 U | 6/2010 |
| CN | 201604486 U | 10/2010 |
| CN | 202294107 U | 7/2012 |

OTHER PUBLICATIONS
International Search Report for PCT/CN2012/081757, dated Dec. 20, 2012.

* cited by examiner

*Primary Examiner* — John Walters
*Assistant Examiner* — James Triggs
(74) *Attorney, Agent, or Firm* — Rossi, Kimms & McDowell LLP

(57) ABSTRACT

An automobile tire anti-skid chain includes lateral chains, one or more longitudinal chains, two tightening side chains and connecting parts. The longitudinal chain has an anti-skid blocks combination and a single anti-skid block in longitudinal alternate series connection. The lateral chain has an anti-skid blocks combination and a single anti-skid block connected in horizontal alternate series. The longitudinal and lateral chains cross and are connected. The single anti-skid block at the intersection is replaced by a connecting part. Ends of the lateral chain are linked to one tightening side chain through the connecting part. A detachable connection device is provided on the tightening side chain, through which the tightening side chain could be jointed into a closed loop. The anti-skid blocks combination has two abreast anti-skid blocks. Part of a single anti-skid block is sandwiched between and hinged with the two abreast anti-skid blocks.

10 Claims, 5 Drawing Sheets

AUTOMOBILE TIRE ANTI-SKID CHAIN EQUIPPED WITH TIGHTENING SIDE CHAINS

This application is a U.S. National Phase Application of PCT International Application PCT/CN2012/081757 filed on Sep. 21, 2012, which is based on and claims priority from CN 201120433145.2 filed on Nov. 4, 2011, the contents of which is incorporated in its entirety by reference.

TECHNICAL FIELD

The present invention relates to a tire anti-skid appliance, particularly relates to an automobile tire anti-skid chain equipped with tightening side chains.

BACKGROUND

In rainy or snowy days, and in mountainous areas, in order to prevent automobile tires from slipping, an anti-skid chain needs to be set outside the tire. However, the existing anti-skid chains in motion show outstanding problems: 1. Installation on the tire is not very firm, which makes the chain easily loose and slip, affecting the safety of vehicles and pedestrians around. 2. The anti-slip effect is poor. 3. The anti-skid chains units appears suspending in the air and uneven loading capacity, which is easy to make the anti-skid units broken, destroyed and affecting its serving life. 4. The installation is complex and troublesome.

CONTENT OF THE UTILITY MODEL

In order to solve the above problems, the present utility model provides an automobile anti-skid chain equipped with tightening side chains with fastening installation, good non-slip effect, durability, quick and easy installation method.

The technical solution of the present utility model: It includes a number of lateral chains, one or more longitudinal chains, two tightening side chains and a plurality of connecting parts. The longitudinal chain is composed of anti-skid blocks combination and a single anti-skid block which are connected in longitudinal alternate series. The lateral chain is composed of an anti-skid blocks combination and a single anti-skid block which are connected in horizontal alternate series. The longitudinal chain and lateral chain cross each other, and the single anti-skid at the intersection is replaced by a connecting part, and by a plurality of the connecting parts, the longitudinal chain and lateral chain are connected as a whole. The left and right ends of the lateral chain are respectively linked to one tightening side chain through the connecting part. A detachable connection device is provided on the tightening side chain, through which the tightening side chain could be jointed into a closed loop.

In order to ensure the lateral and longitudinal chains have good bendability, good anti-slip effect, meantime saving material, the anti-skid blocks combination consists of two abreast anti-skid blocks, a part of a single anti-skid block is sandwiched between the two abreast anti-skid blocks and is hinged with the two blocks.

In order to ensure the lateral and longitudinal chains maintain good flexibility, chained securely, more convenient to install, the anti-skid blocks combination and the single anti-skid block are hinged through connection holes, hinge pin and cotter pin.

In order to ensure more convenient disassembly, the said connecting part and the detachable connection device are two-node ring. In order to maintain good strength and prevent the chain from being broken, the connecting part is a cross-shaped connection block.

In order to obtain better anti-slip effect, the longitudinal distance between the adjacent lateral chains is 20-30 cm.

In order for the length of tightening side chain can be easily adjusted, the tightening side chain is provided with a length adjusting equipment.

In order to achieve better tightening and slacking effect, the length adjusting equipment is an eccentric type adjustment slider, and 2~6 eccentric type adjustment sliders are spaced on one tightening side chain.

In order to facilitate the bendability of the anti-skid chain, and also good anti-slip effect, the length of the two abreast anti-skid blocks and the single anti-skid block is 2-10 cm, thickness is 5-15 mm and height is 10-30 mm For ease of manufacturing and concatenating, the two side-by-side anti-skid blocks and the single anti-skid block have the same shape and size; in order to avoid the automobile tire from being damaged in motion, the upper surfaces of all the three are equipped with non-slip convex parts, while the lower surfaces are plain. Then due to their contact area with the tire is plane, the tire won't be damaged.

In order to prevent the roadbed from being damaged, the non-slip convex parts are a row of trapezoidal flat teeth.

The positive effect of the present utility model is: with the using of tightening side chain, the anti-skid chain could achieve the result of tightening installation, smooth running, noise-free, safe and reliable; The unique anti-skid block will not damage the tire and road; if certain anti-skid block is broken, it can be replaced individually and does not affect the overall use. Since the lateral chain and longitudinal chain are formed through the hinging of several anti-skid blocks, they can vary with the changes of tire shape radians. What's more, good benability make it close to the tire, the non-slip effect is also better, and difficult to be damaged, then it has a long service life. The use of lateral chain, longitudinal chain, tighten side chain connection making the chain easy and fast to be installed, and suitable for automobile tires with different specifications.

DESCRIPTION OF THE DETAILED EMBODIMENTS

Figure 1:
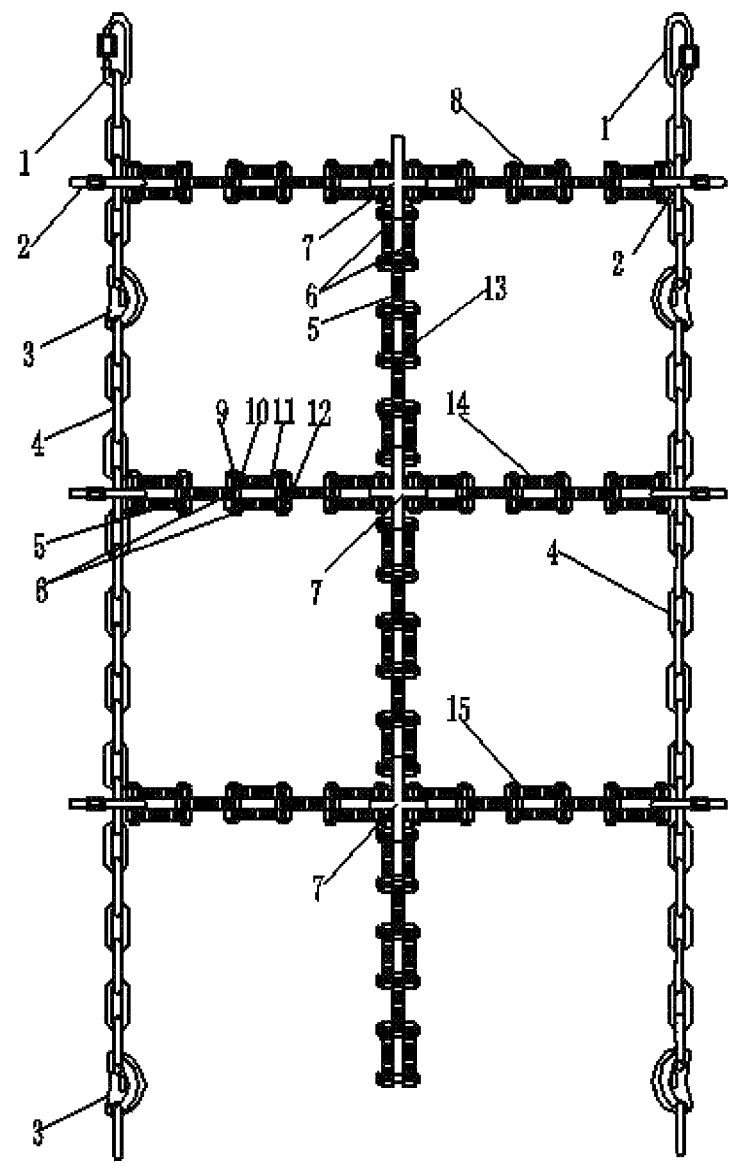
FIG. 1 is a schematic diagram according to a first embodiment of the present utility model.

FIG. 1 shows one of the embodiments of the present utility model. The utility model mainly consists of several lateral chains 8, 14, 15, a longitudinal chain 13, two tightening side chains 4 and multiple cross-shaped connecting block 7. Thereinto the longitudinal chain 13 is composed of an anti-skid blocks combination 6 and a single anti-skid block 5 which are connected in longitudinal alternate series. Each of the lateral chain 14 is composed of an anti-skid blocks combination 6 and a single anti-skid block 5 which are connected in horizontal alternate series.

Figure 6:
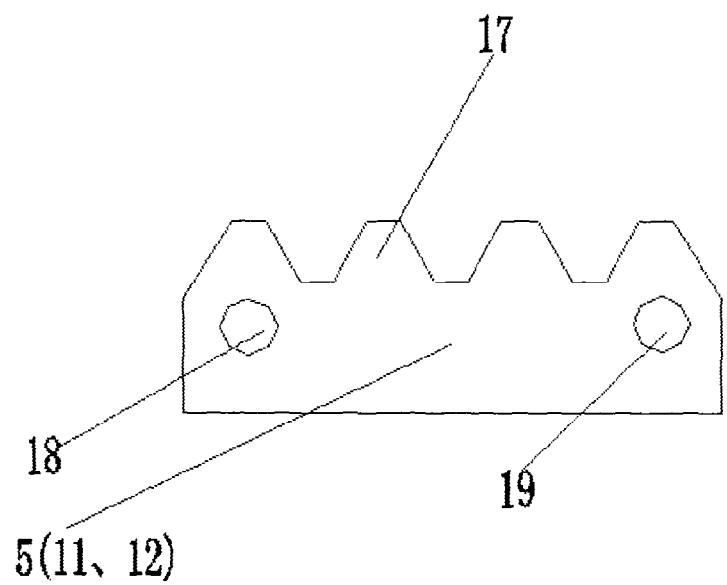
FIG. 6 is the front view of the anti-skid block in the anti-skid blocks combination, and the single anti-skid block.
Figure 7:
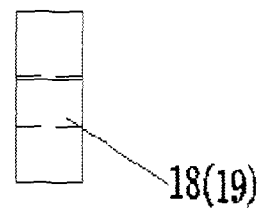
FIG. 7 is a left side view of the FIG. 6
Figure 8:
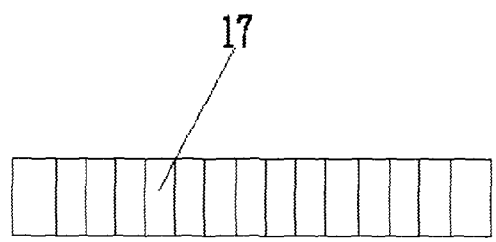
FIG. 8 is a plan view of FIG. 6.

As shown in FIGS. 6, 7, 8, each of the anti-skid combination 6 consists of two side-by-side non-slip blocks 11, 12 with interval of a certain distance, the ends of the two abreast skid block 11, 12 and the single skid block 5, are provided with connecting holes 18, 19.

As shown in FIG. 1, the fore-end of the single anti-skid block 5 is sandwiched between the rear-end of the said two blocks 11, 12 in anti-skid blocks combination 6, and the three blocks are hinged through hinge pin 9. In order to prevent the hinge pin 9 from falling off, it is provided with a cotter pin 10. In addition, they can also be connected by rivets or screws pinching and otherwise. The anti-skid blocks combination 6 may also be composed by more than two side-by-side anti-skid blocks, such as by four side-by-side blocks, spaced distance exists between the two and the other two, the fore-end of a single anti-skid block is rightly sandwiched within the interval space, and the connection relationship is the same with the above.

As shown in FIG. 1, the lateral chains 8, 14, 15 are parallel with each other, the longitudinal distance between adjacent lateral chains 8, 14 is 20-30 cm. Longitudinal chain 13 crosses the lateral chains 8, 14, 15. Each a single anti-skid block at the intersection of longitudinal chain 13 and lateral chain 14 is replaced by a cross-shaped connecting block 7, and the four terminals of each cross-shaped connecting block 7 are provided with connecting holes, hinging each of the lateral chain and the longitudinal chain as a whole through cross connecting block 7.

Figure 2:
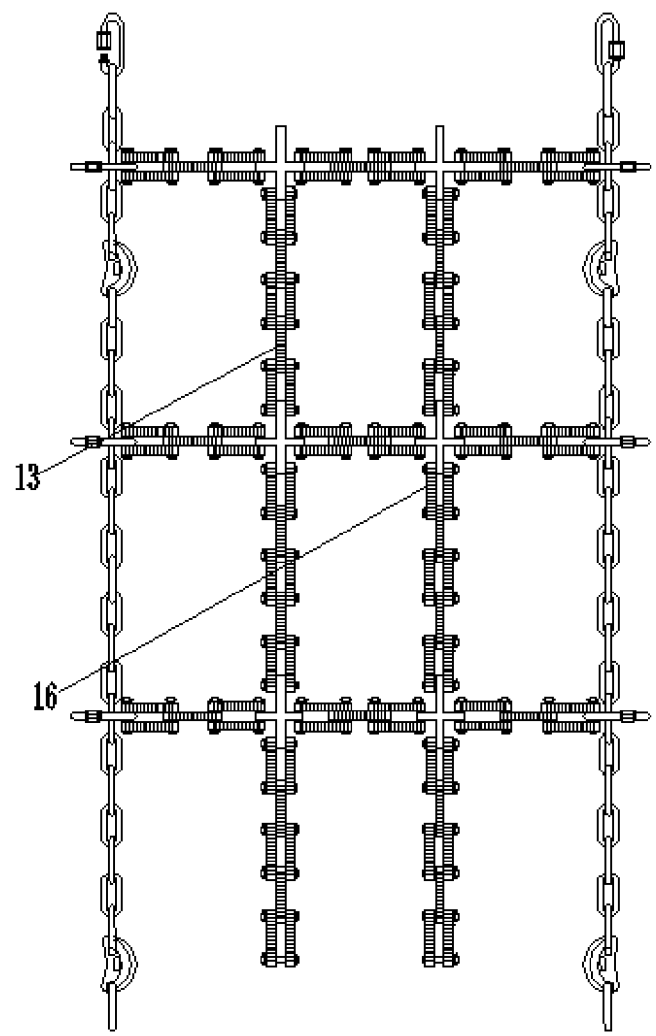
FIG. 2 is a schematic diagram according to a second embodiment of the present utility model.
Figure 3:
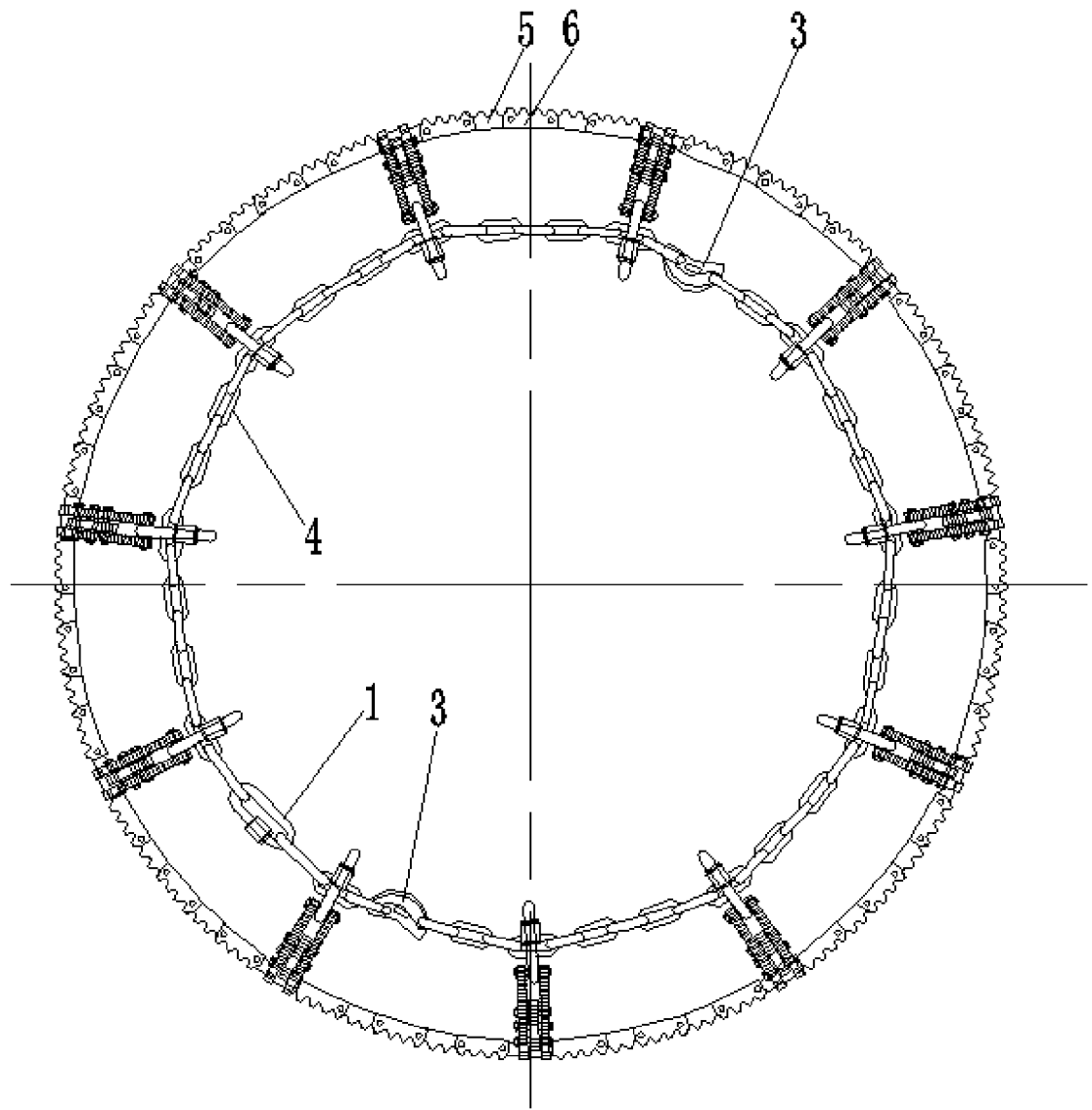
FIG. 3 is a using state diagram of the utility model being installed on the tire.

As shown in FIGS. 1, 2, 3, the left and right ends of each lateral chain 8 are respectively linked with a tightening side chain via a two-node ring 1. The tightening side chain 4 is formed by a plurality of tandem steel chain rings, the steel chain ring at one end of the tightening side chain 4 is connected with a two-node ring, through which the steel chain ring connects with the same ring at the other end, or connects with steel chain ring at other places, to adjust the perimeter of the tightening side chain 4. The tightening side chain becomes a closed loop by the connection of the two-node ring. The two-node ring is in chain-ring shape with an opening and a threaded opening cap, which belongs to existing technology, here no longer expatiate.

According to needs, as a second embodiment of the present utility model, as shown in FIG. 2, in order to enhance the non-slip effect, the present utility model may also be provided with two or more paralleled longitudinal chains 13, 16, other structures and connection relationships are as described above.

Figure 4:
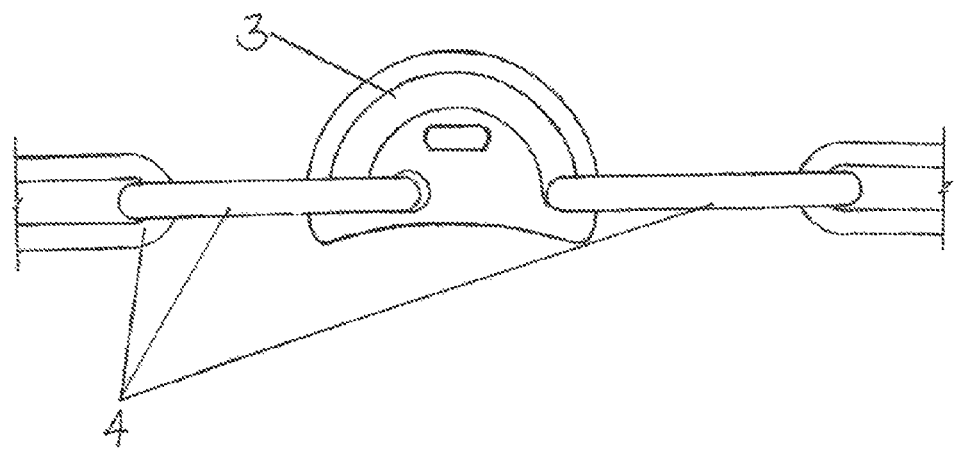
FIG. 4 is a slacking state diagram of the eccentric adjustment slider.
Figure 5:
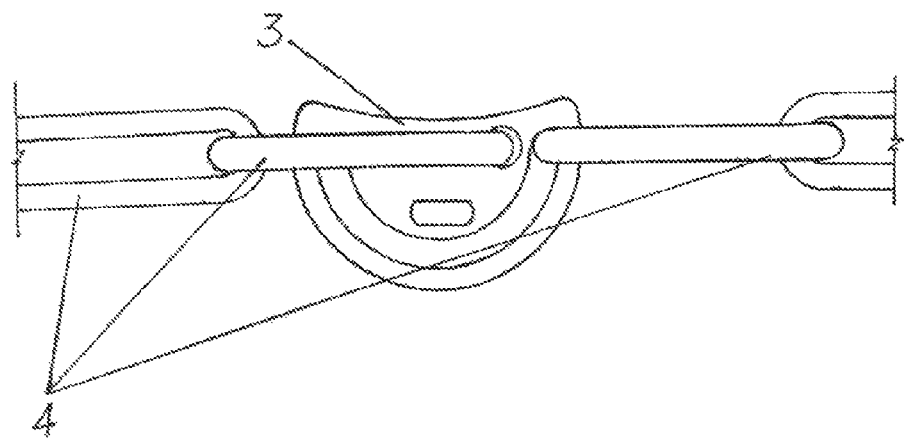
FIG. 5 is a tightening state diagram of the eccentric adjustment slider.

As shown in FIGS. 1, 2, 3, 2-6 eccentric type adjustment sliders are spaced on one tightening side chain. As shown in FIGS. 4, 5, as long as the eccentric adjustment slider further adjusts the perimeter of the tightening side chain, then the anti-skid chains will be always under tension, not only making convenient demolition and installation, but also making easy adjustment of its tightness degree, thus achieving good tightening effect. Eccentric adjustment slider 3 is an existing technology, and here no longer expatiate.

As shown in FIGS. 1, 2, 6, 7, 8, the anti-skid blocks 11, 12 in anti-skid blocks combination 6 of each have the shape and same size with the single anti-skid block 5, all of their upper surface have non-slip convex parts and lower surfaces are flat. The non-slip convex parts are rows of trapezoidal flat teeth 17, and also can be other shapes, in order to increase friction and obtain non-slip purposes.

As shown in FIGS. 6, 7, 8, the anti-skid blocks 11, 12 in anti-skid blocks combination 6 and the single skid block have a length of 2-10 cm, a thickness of 5-15 mm and a height of 10-30 mm. They are all made up of high-quality wear-resistant metal materials.

According to the diameter, width and the actual needs, the number of the lateral chains and longitudinal chains, as well as the number of anti-skid blocks combination and a single anti-skid block in lateral/longitudinal chains, and the number steel chain rings in a tightening side chain could be properly added or reduced.

Through dismantling or installing the cotter pin 10, hinge pin 9 at any position of each longitudinal chain 13, the present utility model could be installed on tire. In addition, in order to make the demolition or installation more convenient, an existing special connection device could be installed at the head and tail of the lateral chain.

The using process of the present utility model is: take the first embodiment as an example, firstly breaking the head end from the tail end of the longitudinal chain 13, disconnecting each tightening side chain 4 from its connection point, secondly spreading the anti-skid chain on the ground, starting the automobile to allow the wheel to move to the middle of the anti-skid chain, thirdly winding the anti-skid chain around the tire, then tightening the chain, and combining the hinge pin with cotter pin at the joint part of anti-skid blocks combination 6 and the single anti-skid block 5 which are at the head end and tail end of the longitudinal chain 13. According to the size of the tire, and then connecting the two-node ring 1 to an appropriate location of the tightening side chain 4, then further tightening each side of the tightening side chain 4 through the eccentric adjustment slider 3, so as to tighten the anti-skid chain and complete the installation process. Jack is not needed in the whole process, by opposite direction operation the chain can be removed which is very convenient.

What is claimed is:
1. The automobile tire anti-skid chain comprising:
a plurality of lateral chains;
at least one longitudinal chain;
two tightening side chains;
a plurality of connecting parts; and
two detachable connecting devices,
wherein each of the at least one longitudinal chain is composed of an anti-skid blocks combination and a single anti-skid block that are connected in longitudinal alternate series,
wherein each of the lateral chain is composed of an anti-skid blocks combination and a single anti-skid block that are connected in horizontal alternate series,
wherein the at least one longitudinal chain and the plurality of lateral chains cross each other,
wherein one of the plurality of connecting parts is disposed at an intersection of the single anti-skid of each of the at least one longitudinal chain and one of the plurality of lateral chains, and
wherein the plurality of connecting parts connect the at least one longitudinal chain and the plurality of lateral chains,
wherein one of the plurality of connecting parts link each left and right ends of the plurality of lateral chains to one of the two tightening side chains,
wherein one of the two detachable connection devices is provided on one of the two tightening side chains to join the respective tightening side chain into a closed loop,
wherein each of the anti-skid blocks combinations includes two abreast anti-skid blocks, wherein part of the single anti-skid block is sandwiched between the two abreast anti-skid blocks and is hinged therewith, wherein the two abreast anti-skid block and the single anti-skid block each have a same shape and size, and wherein the two abreast anti-skid block and the single anti-skid block each have an upper surface composed of non-slip convex parts and a plain lower surface.

2. The automobile tire anti-skid chain according to claim 1, wherein the anti-skid blocks combination and the single anti-skid block are hinged through connection holes, a hinge pin, and a cotter pin.

3. The automobile tire anti-skid chain according to claim 1, wherein:
- each of the connecting parts and the detachable connection devices comprises a-two-node ring, and
- each of the connecting parts comprises a cross-shaped connection block.

4. The automobile tire anti-skid chain according to claim 1, wherein the adjacent lateral chains are spaced 20-30 cm longitudinally.

5. The automobile tire anti-skid chain according to claim 1, wherein each the two tightening side chains is provided with a length adjusting equipment.

6. The automobile tire anti-skid chain according to claim 5, wherein the length adjusting equipment comprises 2-6 eccentric adjustment sliders spaced on each of the two tightening side chains.

7. The automobile tire anti-skid chain according to claim 1, wherein each of the two abreast anti-skid blocks and the single anti-skid block has a length of 2-10 cm, a thickness of 5-15 mm, and a height of 10-30 mm.

8. The automobile tire anti-skid chain according to claim 1, wherein the non-slip convex parts comprise a row of trapezoidal flat teeth.

9. The automobile tire anti-skid chain comprising:
- a plurality of lateral chains;
- at least one longitudinal chain;
- two tightening side chains;
- a plurality of connecting parts; and
- two detachable connecting devices,
- wherein each of the at least one longitudinal chain is composed of an anti-skid blocks combination and a single anti-skid block that are connected in longitudinal alternate series,
- wherein each of the lateral chain is composed of an anti-skid blocks combination and a single anti-skid block that are connected in horizontal alternate series,
- wherein the at least one longitudinal chain and the plurality of lateral chains cross each other,
- wherein one of the plurality of connecting parts is disposed at an intersection of the single anti-skid of each of the at least one longitudinal chain and one of the plurality of lateral chains, and
- wherein the plurality of connecting parts connect the at least one longitudinal chain and the plurality of lateral chains,
- wherein one of the plurality of connecting parts link each left and right ends of the plurality of lateral chains to one of the two tightening side chains,
- wherein one of the two detachable connection devices is provided on one of the two tightening side chains to join the respective tightening side chain into a closed loop, and
- wherein the adjacent lateral chains are spaced 20-30 cm longitudinally.

10. The automobile tire anti-skid chain comprising:
- a plurality of lateral chains;
- at least one longitudinal chain;
- two tightening side chains;
- a plurality of connecting parts; and
- two detachable connecting devices,
- wherein each of the at least one longitudinal chain is composed of an anti-skid blocks combination and a single anti-skid block that are connected in longitudinal alternate series,
- wherein each of the lateral chain is composed of an anti-skid blocks combination and a single anti-skid block that are connected in horizontal alternate series,
- wherein the at least one longitudinal chain and the plurality of lateral chains cross each other,
- wherein one of the plurality of connecting parts is disposed at an intersection of the single anti-skid of each of the at least one longitudinal chain and one of the plurality of lateral chains, and
- wherein the plurality of connecting parts connect the at least one longitudinal chain and the plurality of lateral chains,
- wherein one of the plurality of connecting parts link each left and right ends of the plurality of lateral chains to one of the two tightening side chains,
- wherein one of the two detachable connection devices is provided on one of the two tightening side chains to join the respective tightening side chain into a closed loop,
- wherein each the two tightening side chains is provided with a length adjusting equipment, and
- wherein the length adjusting equipment comprises 2-6 eccentric type adjustment sliders spaced on each of the two tightening side chains.

* * * * *